Nov. 20, 1934.  J. COPLEY  1,981,308
TREE PULLER
Filed June 19, 1934    2 Sheets-Sheet 1
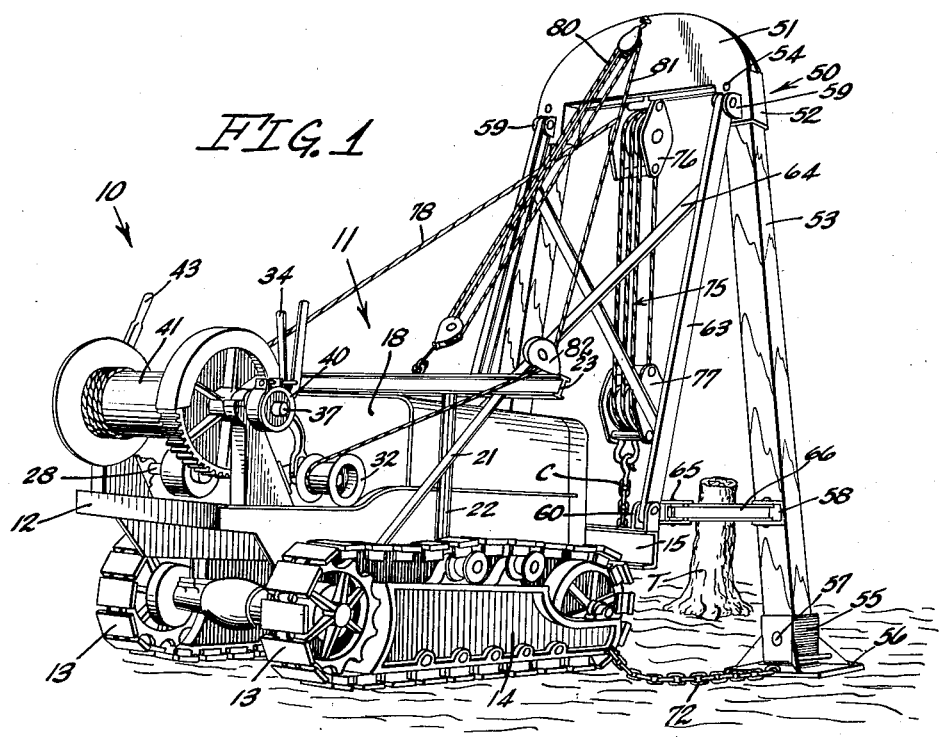
FIG. 1
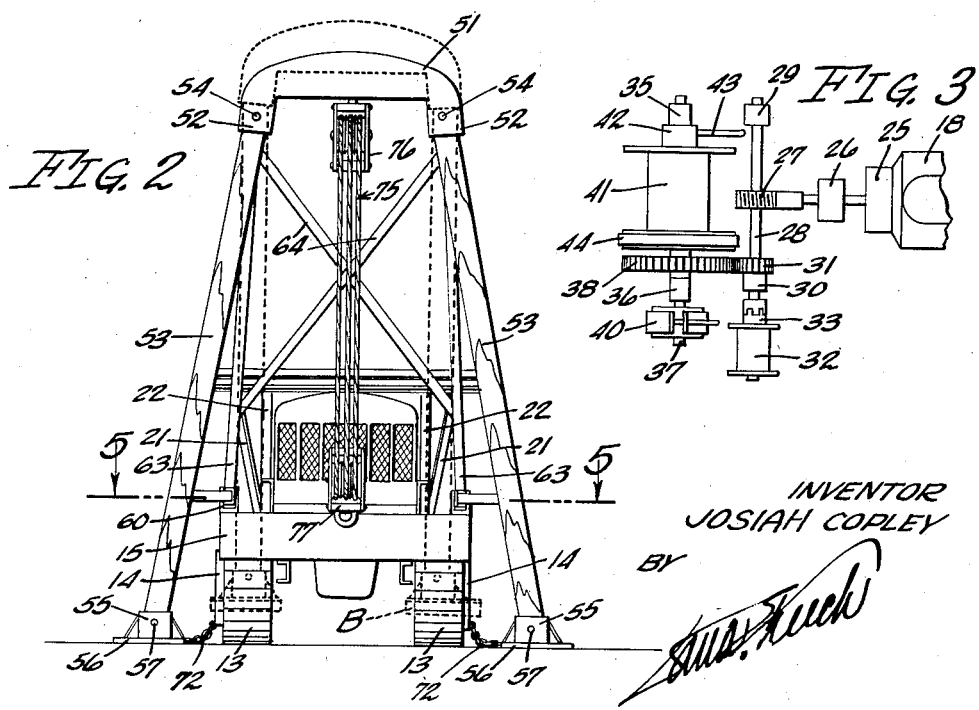
FIG. 2
FIG. 3
INVENTOR
JOSIAH COPLEY
BY
ATTORNEY

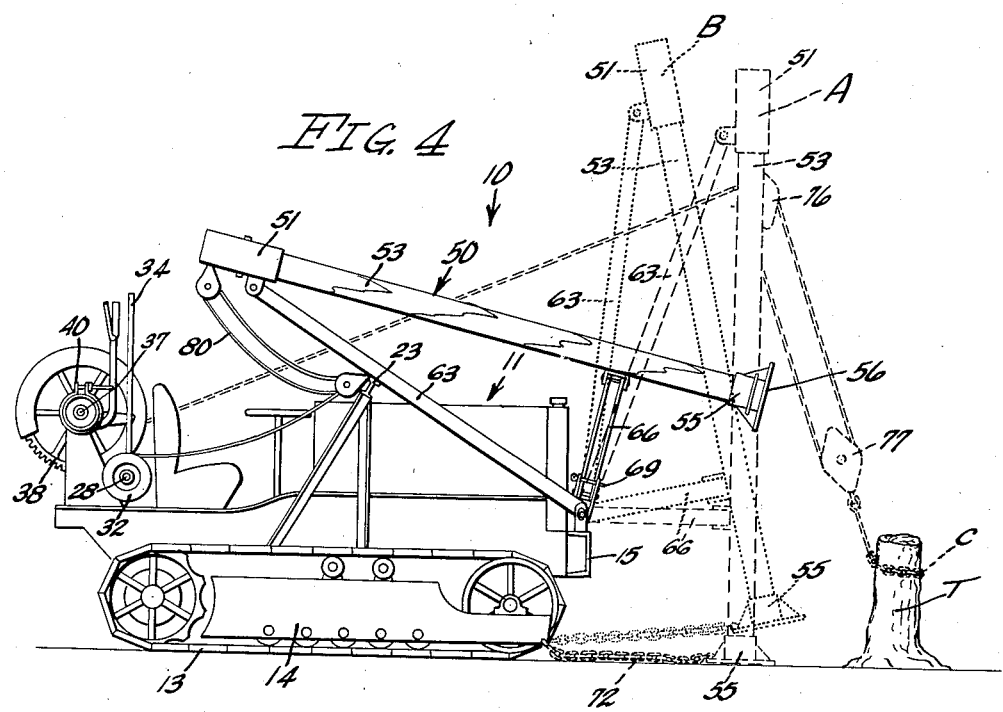
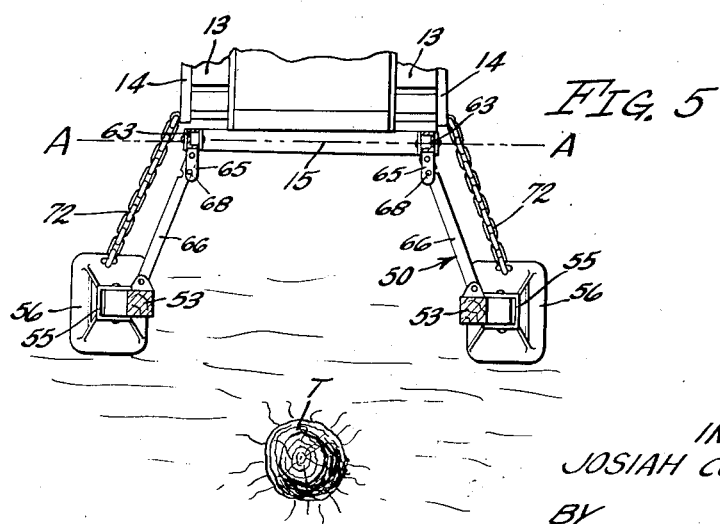

Patented Nov. 20, 1934

1,981,308

UNITED STATES PATENT OFFICE 1,981,308

TREE PULLER

Josiah Copley, Corona, Calif.

Application June 19, 1934, Serial No. 731,280

8 Claims. (Cl. 254—139)

This invention relates to tree pulling apparatus and has as its principal object the provision of such an apparatus by which trees and tree stumps may be quickly and economically pulled from the ground.

It is a further object of my invention to provide such an apparatus which has within itself the means for pulling the tree, for placing itself in condition to travel, and for moving itself from one tree pulling position to another.

It is a still further object of my invention to provide such an apparatus which will have a relatively wide free ground area around the tree while the latter is being pulled.

Another object is to provide a tree puller as last aforestated which may be expanded to provide such free space and then contracted so it will be relatively narrow when in motion, thereby permitting the apparatus to readily move between closely spaced trees in an orchard.

The manner of accomplishing the foregoing objects as well as further objects and advantages will be made manifest in the following description taken in connection with the accompanying drawings, in which:

Fig. 1 is a perspective view of a preferred embodiment of the tree puller of my invention with the inverted-U frame thereof resting on the ground in position for beginning a tree pulling operation.

Fig. 2 is a front elevational view of the tree puller shown in Fig. 1.

Fig. 3 is a diagrammatic view of the power plant and transmission mechanism of my tree puller.

Fig. 4 is a side elevational view of the tree puller of my invention showing the inverted-U frame in full lines in its fully-rearward-reclining travelling position and showing this frame in dotted lines in both its temporarily elevated travelling position and in its position when resting on the ground for pulling a tree.

Fig. 5 is a fragmentary horizontal sectional view taken on the line 5—5 of Fig. 2.

Referring specifically to the drawings in which I have illustrated a preferred embodiment 10 of the tree puller of my invention, this tree puller is seen to include a heavy tractor type of vehicle 11 which is preferably of the "caterpillar" type having a heavy body or frame 12 on opposite sides of which are provided "caterpillar" tread mechanisms 13. Each of the tread mechanisms 13 has a frame member 14, upon which members the body 12 of the "caterpillar" 11 is supported. Rigidly fixed upon the front end of the tractor frame 12 is a deep channel iron bumper 15. Just behind this is the "caterpillar" power plant 18 by which the tree puller 10 is driven. Suitable brakes (not shown) are provided for the "caterpillar" tread mechanisms 13 and also suitable gear mechanisms are provided for driving the "caterpillar" mechanisms 13 from the power plant 18 in the usual and well known manner. Supported transversely across the tractor 11 by supporting frame members 21 and 22 is an I-beam 23, the purpose of which will be made manifest hereinafter.

The tree puller 10 is provided with a power transmission mechanism as clearly shown in Figs. 1, 3, and 4. In Fig. 3 particularly we see that the power plant 18 is connected directly to a main clutch 25 which in turn is connected to take-off gears 26 which are capable of connecting the power plant 18 in a manner well known in the art selectively with one or the other or both of the "caterpillar" mechanisms 13 or with a worm gear mechanism 27 mounted on a jack shaft 28. The jack shaft 28 has bearings 29 and 30, a pinion 31, and a cathead or small hoist drum 32 which is capable of being connected to the shaft 28 by a clutch 33. Mounted in bearings 35 and 36 parallel with the shaft 28 is a shaft 37. Rigidly mounted on the shaft 37 is a gear wheel 38 which meshes with the pinion 31. Also provided on the shaft 37 is a brake 40, while freely rotatable on this shaft is a large hoisting drum 41 which may be connected through a clutch 42 with the shaft 37. Actuating the clutch 42 is a handle 43 as shown in Fig. 1. The drum 41 is also provided with a brake 44 by which rotation of the hoisting drum 41 may be retarded when the clutch 42 is thrown out.

Mounted on the front end of the "caterpillar" tractor 11 is a relatively high, massive, inverted-U frame 50 which includes a metal headpiece 51 formed of heavy plate metal to provide sockets 52 for loosely receiving the upper ends of leg timbers 53 which are pivotally connected to the headpiece by bolts 54 so as to have a limited degree of freedom to swing within the plane of the inverted-U frame 50. The lower ends of the legs 53 are loosely received by sockets 55 on heavy plate metal feet 56, the legs 53 being pivotally connected to the sockets 55 by heavy bolts 57 so as to be free for a limited degree of swinging movement relative to the feet 56 in the plane of the inverted-U frame 50.

Fixed on the rear faces of the legs 53 are pivotal connecting brackets 58, while pivotal connecting ears 59 are provided on the headpiece 51 to extend rearwardly therefrom. Also rigidly secured on the bumper 15 of the "caterpillar" tractor 11 are pivot mounting ears 60. The inverted-U frame is connected to the "caterpillar" tractor 11 by a pair of struts 63, the upper ends of which are connected by suitable bolts to the ears 59 and the lower ends of which are pivotally mounted between the ears 60 on an axis which will hereafter be referred to as an articulating axis. The struts 63 are braced together by cross-braces 64. The lower ends of the struts 63 have rigidly mounted thereon channel iron receptacles 65 which extend forwardly therefrom and pivotally receive the rear ends of links 66, the forward ends of which are pivotally received by the brackets 58. As shown in Figs. 4 and 5, the receptacles 65 are provided with keeper pin holes 68 through which keeper pins 69 may be inserted when the legs 53 have been swung into their inward position so as to retain these legs in this position, as shown in Fig. 4, by preventing the links 66 from swinging outwardly.

Connected to the rear edge of each of the feet 56 is a lifted position limiting chain 72, the rear end of which is normally detachably connected to the adjacent tread frame member 14 as clearly shown in Fig. 1.

Suspended centrally from the headpiece 51 is a block and tackle mechanism 75 including upper and lower blocks 76 and 77 and a strand of cable 78. After passing around the various sheaves of the blocks 76 and 77 the cable 78 extends from the upper block 76 to the winding drum 41 as shown in Fig. 1. Extending between the I-beam 23 and the headpiece 51 is a relatively small inverted-U frame lifting tackle 80, a cable 81 from which extends through a block 82 mounted on the right-hand end of the I-beam 23 and then is wrapped around the cathead hoist 32.

*Operation*

When travelling from place to place the legs 53 of the inverted-U frame 50 are swung inwardly and secured in place by the pins 69, and the U-frame with its spacing structure is then rocked rearwardly until it rests upon the I-beam 23 as shown in full lines in Fig. 4. When starting work in the pulling of trees in any orchard the inverted-U frame 50 is swung forwardly into its dotted line position A shown in Fig. 4 which is shown in full lines in Figs. 1 and 2 and the chains 72 are now connected to the tread frame members 14. These chains are of such length as to permit the limited upward movement of the inverted-U frame 50 to the temporary travelling position B as shown in Figs. 2 and 4. In the position B the chains 72 are stretched taut and the feet 56 lifted from the ground. The lifting of the frame 50 to the position B is for the purpose of permitting the movement of the tree puller 10 from one stump pulling position to the next and is accomplished by throwing out the clutch 42, putting on the brake 44, throwing off the brake 40, throwing out the main clutch 25, operating the gears 26 to cause these to connect the clutch 25 with the worm gear mechanism 27, and then throwing in the clutch 25 causing the power plant 18 to rotate the shaft 28. This winds up the cable 81 on the cathead hoist 32 and contracts the block and tackle 80 so as to swing the inverted-U frame 50 into its position B in which it is retained by the setting of the brake 40, the throwing out of the clutch 25, and the placing of the gears 26 in neutral. The tension of the chains 72 on the legs 53 when the inverted-U frame 50 is thus lifted, swings the legs 53 inward into their inwardly retracted positions as shown in Fig. 2. The legs 53 are thus disposed substantially entirely inward in front of the "caterpillar" tractor 11, thus permitting the tree puller 10 to pass between the trees of the orchard in which it is working.

With the inverted-U frame 50 in the position B the driver of the tree puller 10 sets the gears 26 to connect with the "caterpillar" tread mechanisms 13 and the clutch 25 is then let in so as to move the tree puller to a new location, as for pulling a tree T. The position relative to the tree T into which the tree puller 10 is maneuvered is clearly shown in Figs. 1, 4, and 5. This position is such that when the frame 50 is lowered to bring the feet 56 onto the ground, as shown in these figures, the tree T is at the vertex of an isosceles triangle, at the opposite ends of the base of which the feet 56 are to be found. In the preferred embodiment of my invention disclosed herein the altitude of this triangle is substantially equal to the distance horizontally between the center line of the feet 56 and the articulating axis A—A as shown in Fig. 5. After the caterpillar tractor 11 has been positioned relative to the tree T, as shown in Figs. 1, 4, and 5, the brake 40 is released to permit the shafts 28 and 37 to turn, allowing the cable 81 to unwind from the cathead hoist drum 32, thus lowering the feet 56 of the inverted-U frame 50 onto the ground. As these feet are lowered they are grasped by members of the operating crew and swung outwardly so as to spread the legs 53 as shown in Figs. 1, 2, and 5.

The chain is now tied around the stump of the tree T as indicated in Fig. 4 and fastened onto the lower end of the block 77. The engineer of the tree puller 10 now throws out the clutch 33, thus disconnecting the cathead 32 from the shaft 28, releases the brakes 40 and 44, throws out the clutch 25, shifts the gears 26 in their proper positions for rotating the shafts 28 and 37, throws in the clutch 25 so as to cause the gears 26 to rotate the shafts 28 and 37, and then standing over the left-hand side of the machine grasps the lever 43 and throws in the clutch 42, causing the drum 41 to be rotated so as to wind up the cable 78 thereon. This contracts the tree-pulling block and tackle 75 so as to pull the tree T, roots and all, from the ground. After this has been accomplished the clutch 42 may be thrown out allowing the drum 41 to reverse and the lower block 77 to be lowered so that the chain C may be removed from the tree T. The frame 50 is now again rocked rearwardly into its position B, and the tree puller 10 moved to a new tree pulling position as above described.

There are numerous advantages in using the tree puller 10 for pulling trees over other methods of extracting trees from the soil, among these advantages being the fact that the entire root structure is pulled from the ground with the tree. The ease with which this can be done results partly from the large amount of free space which is possible to have around the tree owing to the feet 56 setting backwards away from the tree and being swung outwardly therefrom as shown in Fig. 5. To do this requires that a forward pull be exerted on the inverted-U frame 50 and in the tree puller 10 this is compensated for by the application of the weight of the vehicle 11 to the rearwardly extending structure 63—66 on the articulating axis A—A and the fact that the cable 78 passes rearwardly to the winch 41 a considerable distance above the articulating axis A—A. The weight of the vehicle 11 thus is almost entirely available as a counterweight upon the inverted-U frame 50 to offset the forward pull of the tackle 75 in pulling the tree.

While I have shown and described only a single form of my invention, it is to be understood that the claims are to be read with as broad a scope as the state of the prior art will warrant.

What I claim is:

1. In a tree puller, the combination of: a tractor type of vehicle having a power unit for self-propulsion; a relatively high, massive, inverted-U frame adapted to rest on the ground a relatively short distance in front of said vehicle in an upright position; a rigid structure secured to an upper portion of said frame and extending downwardly and rearwardly therefrom; means connecting the lower end of the aforesaid structure to said vehicle, said means restricting free movement between said vehicle and said structure to a pivotal relationship about a horizontal axis extending transversely across the front of said vehicle; means for rigidly spacing the lower ends of the legs of said frame forwardly from the front end of said vehicle; tree pulling tackle suspended from said frame; and means for connecting said tractor power unit to said tackle to actuate the latter.

2. A combination as in claim 1 in which said rigid spacing means comprises members pivotally connected at their front ends to said legs on vertical axes and at their rear ends to said vehicle with universal joints and in which said legs are pivotally connected to an upper portion of said frame on horizontal axes which permit said legs a limited degree of inward and outward swinging movement when they are lifted off the ground; and means connected to said tractor power unit to rock said frame, said structure, and said rigid spacing means rearwardly and upwardly about said axis.

3. A combination as in claim 1 in which means connected to said power unit is provided for rocking said frame, said structure, and said spacing means rearwardly and upwardly as a unit about said axis.

4. In a tree puller, the combination of: a tractor type of vehicle having a power unit for self-propulsion; a relatively high, massive, inverted-U frame adapted to rest on the ground in upright position in a plane substantially halfway between the front end of said vehicle and a tree to be pulled; tree pulling blocks and tackle suspended from the apex of said frame and adapted to grapple said tree, said power unit being connected to said tackle and adapted to pull thereon to actuate said blocks and tackle to pull up said tree; and rigid means provided on said frame, said means extending rearwardly from upper and lower portions of said frame and pivotally connecting with the front end of said vehicle on a horizontal axis, thereby causing any substantial forward tilting of said frame during the pulling of a tree to lift the front end of said vehicle off the ground.

5. In a tree puller, the combination of: a tractor type of vehicle having a power unit for self-propulsion; a relatively high, massive, inverted-U frame adapted to rest on the ground in upright position in a plane substantially halfway between the front end of said vehicle and a tree to be pulled; tree pulling blocks and tackle suspended from the apex of said frame and adapted to grapple said tree, said power unit being connected to said tackle and adapted to pull thereon to actuate said blocks and tackle to pull up said tree; rigid means provided on said frame, said means extending rearwardly from upper and lower portions of said frame and pivotally connecting with the front end of said vehicle on a horizontal axis, thereby causing any substantial forward tilting of said frame during the pulling of a tree to lift the front end of said vehicle off the ground; means operative in between tree pulling operations to swing said frame and rigid means as a unit upwardly and rearwardly about said pivot axis into an inoperative position with the center of gravity disposed rearwardly of said pivot axis; and a rest on said vehicle for receiving and supporting said unit when so disposed.

6. In a tree puller, the combination of: a tractor type of vehicle having a power unit for self-propulsion; a relatively high, massive, inverted-U frame adapted to rest on the ground in upright position in a plane substantially halfway between the front end of said vehicle and a tree to be pulled; tree pulling blocks and tackle suspended from the apex of said frame and adapted to grapple said tree, said power unit being connected to said tackle and adapted to pull thereon to actuate said blocks and tackle to pull up said tree; rigid means provided on said frame, said means extending rearwardly from upper and lower portions of said frame and pivotally connecting with the front end of said vehicle on a horizontal axis, thereby causing any substantial forward tilting of said frame during the pulling of a tree to lift the front end of said vehicle off the ground; means operative in between tree pulling operations to swing said frame and rigid means as a unit upwardly about said pivot axis into an inoperative travelling position with the center of gravity of said unit disposed forwardly of said pivot axis; and stop means for halting said swinging of said unit with the latter in said position.

7. In a tree puller, the combination of: a tractor type of vehicle having a power unit for self-propulsion; a relatively high, massive, inverted-U frame adapted to rest on the ground in upright position in a plane substantially halfway between the front end of said vehicle and a tree to be pulled; tree pulling blocks and tackle suspended from the apex of said frame and adapted to grapple said tree, said power unit being connected to said tackle and adapted to pull thereon to actuate said blocks and tackle to pull up said tree; rigid means provided on said frame, said means extending rearwardly from upper and lower portions of said frame and pivotally connecting with the front end of said vehicle on a horizontal axis, thereby causing any substantial forward tilting of said frame during the pulling of a tree to lift the front end of said vehicle off the ground; means operative in between tree pulling operations to swing said frame and rigid means as a unit upwardly about said pivot axis into an inoperative travelling position with the center of gravity of said unit disposed forwardly of said pivot axis; and chains extending from said frame for halting said swinging of said unit with the latter in said position.

8. In a tree puller, the combination of: a tractor type of vehicle having a power unit for self-propulsion; a relatively high, massive, inverted-U frame adapted to rest on the ground in upright position in a plane substantially halfway between the front end of said vehicle and a tree to be pulled; tree pulling blocks and tackle suspended from the apex of said frame and adapted to grapple said tree, said power unit being connected to said tackle and adapted to pull thereon to actuate said blocks and tackle to pull up said tree; rigid means provided on said frame, said means extending rearwardly from upper and lower portions of said frame and pivotally connecting with the front end of said vehicle on a horizontal axis, thereby causing any substantial forward tilting of said frame during the pulling of a tree to lift the front end of said vehicle off the ground; means operative in between tree pulling operations to swing said frame and rigid means as a unit upwardly and rearwardly about said pivot axis into an inoperative position with the center of gravity disposed rearwardly of said pivot axis; a rest on said vehicle for receiving and supporting said unit when so disposed; and stop means optionally operable during said swinging of said unit to halt said unit in a lifted position with the center of gravity thereof disposed forwardly of said pivot axis.

JOSIAH COPLEY.